(12) United States Patent
Houseworth et al.

(10) Patent No.: US 11,769,146 B1
(45) Date of Patent: Sep. 26, 2023

(54) BLOCKCHAIN TRANSACTIONAL IDENTITY VERIFICATION

(71) Applicant: HRB Innovations, Inc., Las Vegas, NV (US)

(72) Inventors: Jason Houseworth, Olathe, KS (US); Travis Giggy, Palo Alto, CA (US); Roman Breslav, Newton, MA (US); Daniel D. Martin, Kansas City, MO (US)

(73) Assignee: HRB Innovations, Inc., Las Vegas, NV (US)

( * ) Notice: Subject to any disclaimer, the term of this patent is extended or adjusted under 35 U.S.C. 154(b) by 876 days.

(21) Appl. No.: 15/281,481

(22) Filed: Sep. 30, 2016

(51) Int. Cl.
*G06Q 20/38* (2012.01)
*G06Q 20/40* (2012.01)
*H04L 9/40* (2022.01)

(52) U.S. Cl.
CPC ....... *G06Q 20/3829* (2013.01); *G06Q 20/401* (2013.01); *H04L 63/102* (2013.01); *H04L 63/126* (2013.01); *G06Q 2220/00* (2013.01)

(58) Field of Classification Search
CPC .............. G06Q 20/3829; G06Q 20/401; H04L 63/102; H04L 63/126
USPC .......................................................... 705/71
See application file for complete search history.

(56) References Cited

U.S. PATENT DOCUMENTS

| | | | |
|---|---|---|---|
| 8,359,278 B2* | 1/2013 | Domenikos | G06Q 40/08 705/325 |
| 9,189,788 B1* | 11/2015 | Robinson | G06Q 20/40145 |
| 9,760,697 B1* | 9/2017 | Walker | G06F 21/602 |
| 9,858,781 B1* | 1/2018 | Campero | H04L 9/3242 |
| 11,188,918 B1* | 11/2021 | Kurani | G06Q 20/405 |
| 2016/0267022 A1* | 9/2016 | Schoenberger | G06F 3/0623 |
| 2016/0330027 A1* | 11/2016 | Ebrahimi | H04L 9/0637 |
| 2016/0330035 A1* | 11/2016 | Ebrahimi | H04L 9/3236 |
| 2016/0342994 A1* | 11/2016 | Davis | G06Q 20/4014 |
| 2016/0352717 A1* | 12/2016 | Shewchuk | H04L 63/08 |
| 2017/0177855 A1* | 6/2017 | Costa Faidella | G06F 21/45 |
| 2017/0214675 A1* | 7/2017 | Johnsrud | H04L 9/3242 |
| 2017/0243212 A1* | 8/2017 | Castinado | H04L 9/3236 |
| 2017/0243214 A1* | 8/2017 | Johnsrud | G06Q 20/3823 |
| 2017/0295157 A1* | 10/2017 | Chavez | H04L 63/08 |
| 2017/0331810 A1* | 11/2017 | Kurian | H04L 63/083 |
| 2017/0366348 A1* | 12/2017 | Weimer | H04L 9/3247 |
| 2018/0005239 A1* | 1/2018 | Schlesinger | G09C 5/00 |
| 2018/0025140 A1* | 1/2018 | Edelman | G06F 21/316 726/7 |
| 2018/0075453 A1* | 3/2018 | Durvasula | G06Q 20/389 |
| 2018/0075527 A1* | 3/2018 | Nagla | G06Q 40/025 |
| 2018/0082290 A1* | 3/2018 | Allen | H04L 63/0807 |

(Continued)

Primary Examiner — Courtney P Jones
(74) Attorney, Agent, or Firm — Erise IP, P.A.

(57) ABSTRACT

System and media for determining whether to conduct a transaction with a consumer claiming an identity. Identity points for the identity are stored in a first blockchain. Past transactions conducted by the party are stored in a second blockchain. Permission to read and/or write to the various blockchains are stored in a third blockchain. When the consumer desires to conduct a transaction, they can append a permission for the counterparty to access the identity and/or transaction chains to their permission chain. The counterparty can then make an informed decision as to whether to conduct the transaction with the consumer based on the information stored in the various blockchains.

20 Claims, 4 Drawing Sheets

(56) References Cited

U.S. PATENT DOCUMENTS

2018/0205537 A1\* 7/2018 Wilson ............... G06Q 30/0601
2018/0262493 A1\* 9/2018 Andrade ............. H04L 63/0861
2018/0285879 A1\* 10/2018 Gadnis ................ G06F 16/1805
2019/0074969 A1\* 3/2019 Spies .................. G06F 21/6218

\* cited by examiner

BLOCKCHAIN TRANSACTIONAL IDENTITY VERIFICATION

RELATED APPLICATIONS

This non-provisional patent application shares certain subject matter in common with earlier-filed U.S. patent application Ser. No. 15/240,202, filed Aug. 18, 2016, and entitled ONLINE IDENTITY SCORING. The identified earlier-filed patent application is hereby incorporated by reference in its entirety into the present application.

BACKGROUND

1. Field

Embodiments of the invention generally relate to determining whether a person is who they claim to be and, more particularly, to providing a blockchain-based identity verification technique that can be used even when the person is not physically present.

2. Related Art

Traditionally, identity has been verified by presenting physical, tamper-resistant identity documents such as a driver's license or passport. These documents are tied to both the claimed identity (by including a name or other unique identifier) and to the claimant (by including a picture or other description and by virtue of being in the claimant's possession). Because such documents are tamper-resistant, it is difficult for a malicious actor to forge documents claiming a false identity.

However, transactions are increasingly carried out when the parties are not in the same physical location, such as over the Internet. This makes it significantly more difficult to authenticate the parties, because the physical documents cannot be examined. Nor are digital images (for example, digital scans) of the documents a viable alternative, because the digital images can be altered or copied and are accordingly much less secure. Accordingly, there is a need for a secure, distributed technique to authenticate a claimant as a claimed identity that is secure and can be utilized when the parties are not in the same physical location.

SUMMARY

Embodiments of the invention address this need by providing for a blockchain-based system for storing verified identity documents and transactions. In particular, in a first embodiment, the invention includes A method for determining whether to conduct a transaction with a party, comprising the steps of receiving a request, from the party, to conduct the transaction, accessing a permission element associated with the party to retrieve a permission to access an identity element associated with the party and a permission to access a transaction element associated with the party, using the permission to access the identity element associated with the party to retrieve an identity point for the party, verifying an identity of the party based at least in part on the identity point for the party, using the permission to access the transaction element associated with the party to retrieve one or more past transactions associated with the party, determining, based at least in part on the one or more past transactions, to conduct the transaction with the party, conducting the transaction with the party; and appending information associated with the transaction to the transaction element associated with the party.

In a second embodiment, the invention includes one or more computer-readable media storing computer-executable instructions that, when executed by a processor, perform a method for strengthening an identity for a consumer over time, comprising the steps of conducting, by a first institution, a first transaction with the consumer, appending a transaction block to a blockchain associated with the consumer, wherein the transaction block includes a plurality of details associated with the first transaction, receiving, by a second institution, a request to conduct a second transaction with the consumer, granting, by the consumer and to the second institution, a permission to access the transaction block, accessing, using the permission and by the second institution, the transaction block, and verifying the identity of the consumer based at least in part on at least one detail of the plurality of details associated with the first transaction.

In a third embodiment, the invention includes one or more computer-readable media storing plurality of blocks, the plurality of blocks comprising an identity block for a consumer, wherein the identity block is writable only by a trusted third party, wherein the identity block is readable only by the consumer and parties authorized by the consumer, and wherein the identity block stores a plurality of identity points for the consumer; a transaction block for the consumer, wherein the transaction block is readable only by the consumer and parties authorized by the consumer, and wherein the transaction block stores information related to a plurality of transactions to which the consumer was a party; and a permissions block for the consumer, wherein the permission block is writable only by the consumer, and wherein the permission block stores permissions for third parties to access the identity chain for the consumer and the transaction chain for the consumer.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
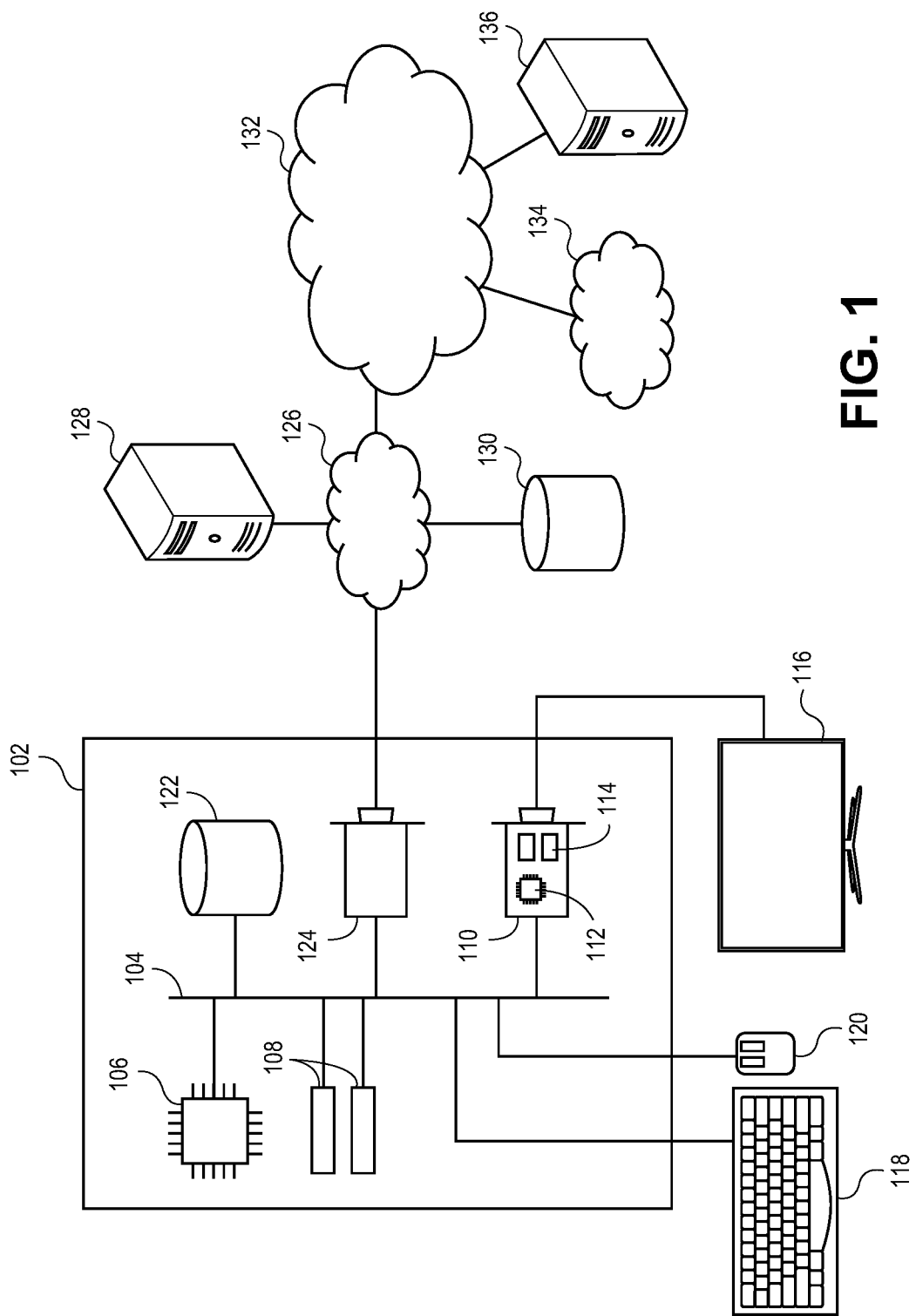
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention develop and iteratively strengthen an identity profile for a consumer based on the transactions to which the consumer has been a party. For example, when the consumer conducts a transaction with an institution, that institution can publish the details of that transaction (such as the parties to the transaction, monetary amount of the transaction, etc.) in encrypted form to the consumer's blockchain. Other information may be additionally stored in the same blockchain or additional chains to manage identity verification and permissions management for access to the transaction chains.

The information stored in the consumer's block chain over time slowly strengthens their identity profile and allows them to be identified for subsequent transactions. For example, when the consumer desires to conduct a later transaction with a different institution, they can selectively grant that institution access to their block chain (i.e., the consumer can grant specific institutions access to the whole blockchain or to only specific portions of the blockchain). That institution can then use the details of the consumer's previous transactions to determine whether to authorize the transaction based on verifying the consumer's identity and creditworthiness.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
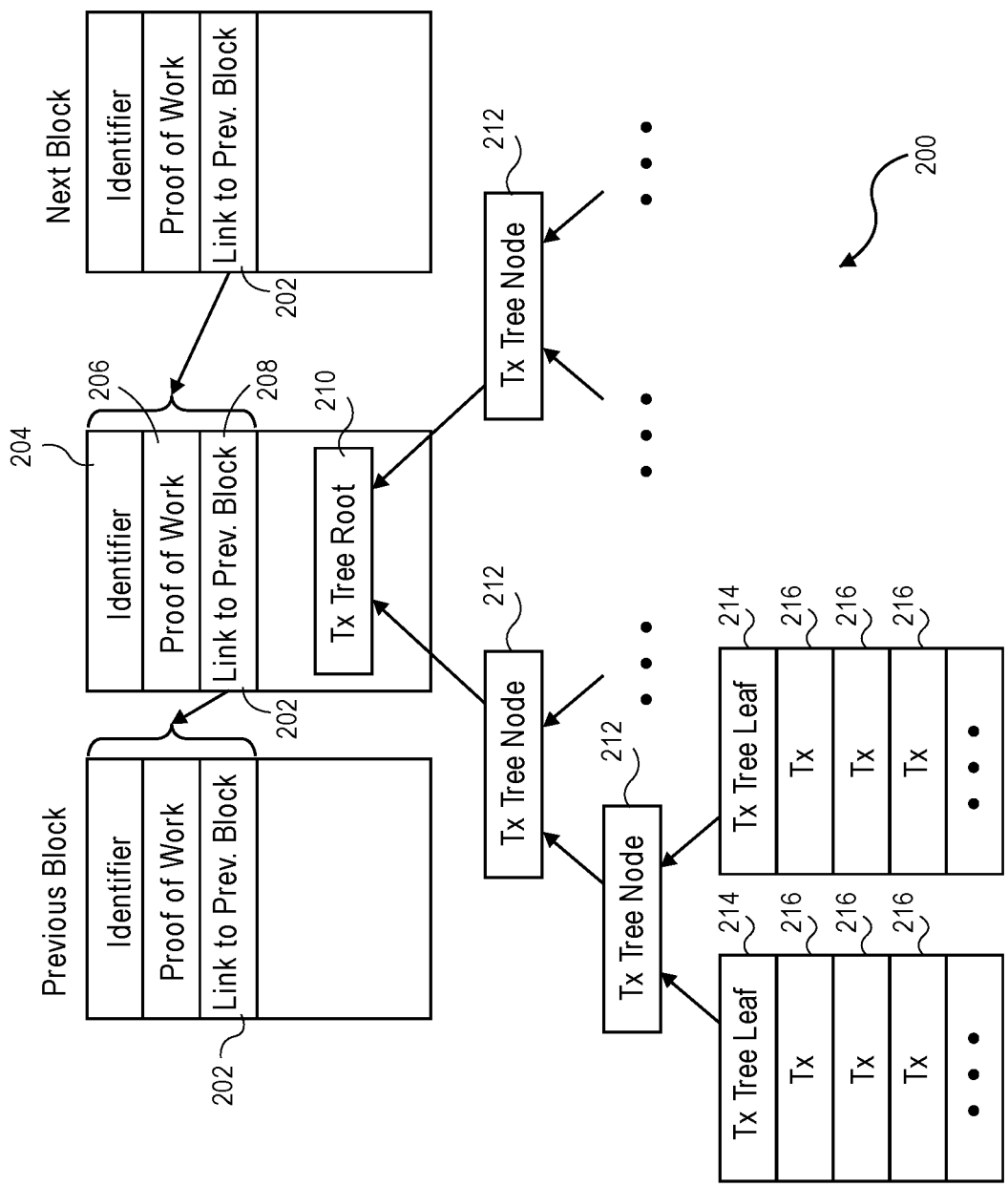
FIG. 2 depicts a representative blockchain suitable for use with embodiments of the present invention.

Turning now to FIG. 2, a representative blockchain suitable for use with embodiments of the present invention is depicted and referred to generally by reference numeral 200. Broadly speaking, blockchain 200 is a distributed database that maintains a continuously updated record of transactions that cannot be altered or tampered with and comprises an ordered collection of blocks such as block 202. A computer (such as computer 102) in the distributed network (such as local network 126 or Internet 132) utilizing blockchain 200 maintains a copy of each block 202 and can thus verify transactions in the blockchain. Block 202, in turn, comprises elements ensuring the integrity if blockchain 200 and transaction data making up the payload of blockchain 200. The term "transaction" as used herein, may refer to either the payload of blockchain block 202 or to a financial interaction between two or more parties. The intended meaning for each use will be apparent to one of skill in the art.

As depicted, the integrity elements of block 202 include identifier 204. In some embodiments, identifier 204 may be a serial number or other arbitrary unique value for identifying a particular block 202 of blockchain 200 and determining block order without manually resorting blockchain 200 based on other fields. In other embodiments, identifier 204 is a timestamp representing the time of creation of block 202. In still other embodiments, identifier 204 is integrated with or replaced by other fields of block 204. In yet other embodiments, identifier 204 may not be present.

Also included in block 202 is proof of work 206. A proof of work can be used to limit the rate at which new blocks can be added to blockchain 200, or to allow participants in the distributed network to compete to generate a new block to be added to the system. One type of proof of work is finding a preimage value that hashes to a given partial value under a predetermined hash function. For example, it might be required that the first 16 bits of the hash value match the timestamp of the previous block. Since hash functions are generally impossible to invert in better-than-brute-force time, participants in the blockchain must hash random values until the desired partial value results. Other participants in the system can then easily verify that this preimage hashes to the correct partial value to verify that the work was performed. Because of the computation taken to generate the proof of work, no participant in the system can add excessive blocks to blockchain 200.

The next component typically present in blockchains such as blockchain 200 is link 208, which establishes the order of blocks 202 making up blockchain 200. As depicted, link 208 may be the hash of one or more header fields of the previous block. For example, the value for link 208 might be the hash of the concatenation of identifier 204 and proof-of-work 206 for the previous block 202. In this way, blocks 202 can be ordered, and it is generally impossible to create a block before its immediate predecessor has been published throughout the distributed system.

In addition to the integrity elements, block 202 includes transaction data 210 making up the payload of blockchain 200. Thus, the integrity elements described above may be viewed as metadata associated with transaction data 210. In some embodiments, transaction data 210 may be included in block 202. In other embodiments, transaction data 210 is not stored directly in the blockchain, but a summary or other verification (e.g., a hash) is stored in blockchain 200 to allow externally stored transaction data to be verified using blockchain 200.

In the particular embodiment depicted, block 202 stores as transaction data 210 the root of a Merkle tree. In such an embodiment, one or more transactions 216 are stored in each leaf node node 214 of the Merkle tree. Each node 212 of the Merkle tree then stores the hash of the values stored in its child nodes 212, and only the root of the tree is stored in block 202. In this way, transactions can be verified in logarithmic time by tracing the path from the leaf node up to the Merkle root, which is in turn verified by block 202 of blockchain 200. One of skill in the art will appreciate that many different variations and rearrangements of these components are possible under the broad concept of a blockchain.

Ultimately, blockchain 200 stores transactions 216 in a verifiable fashion. A blockchain transaction may ultimately be any type of data. For example, the BitCoin blockchain stores literal transactions (i.e., exchanges of digital currency). Other uses of blockchains store other types of data as transactions. For example, the Etherium chain can use the blockchain as a distributed virtual machine with transactions variously representing code, state for the virtual machine, contracts, and digital currency exchanges. One of skill in the art will appreciate that any type of data may be stored in transaction 216, and that data so stored may be stored in publicly readable form or in in encrypted form depending on the use to which a particular blockchain is being put.

Figure 3:
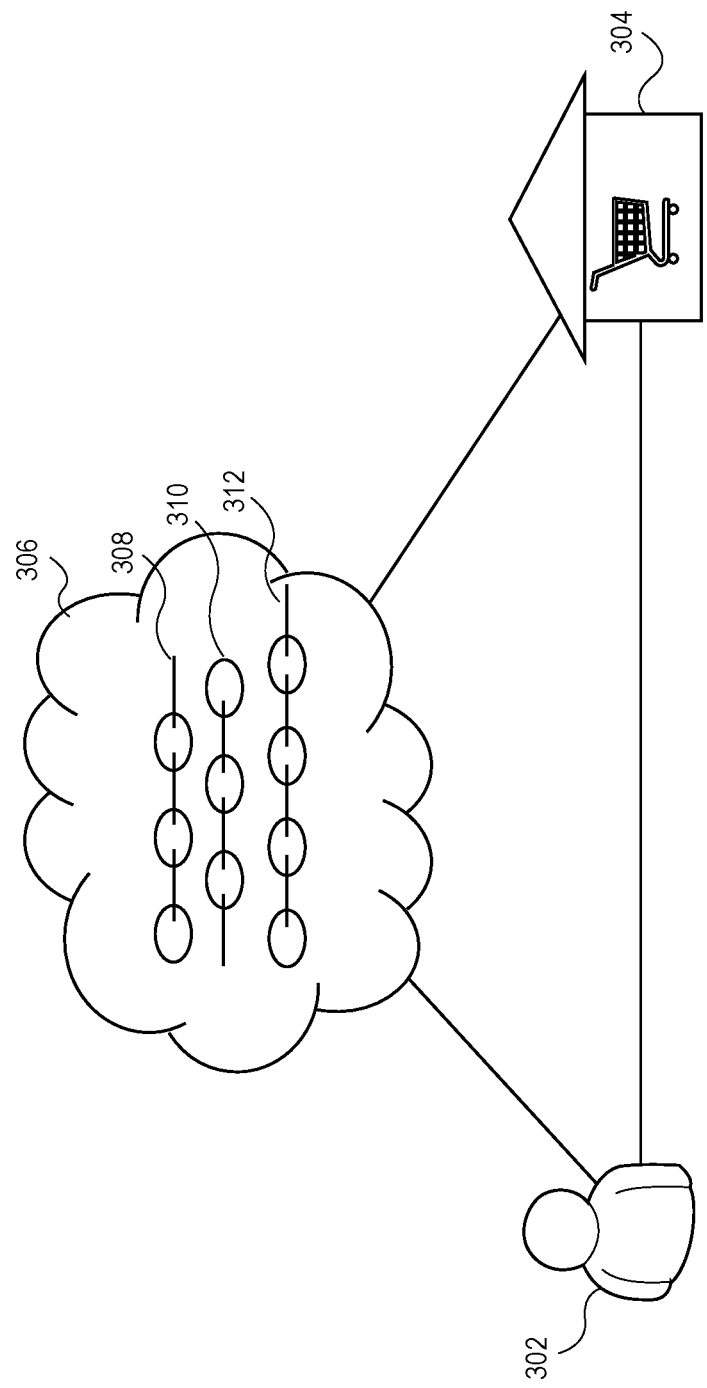
FIG. 3 depicts a diagram depicting the principals in a transactional identity verification system.

Turning now to FIG. 3, a diagram depicting the principals in a transactional identity verification system are depicted and referred to generally by reference numeral 300. Broadly, consumer 302 desires to conduct business with institution 304. To prevent fraud, institution 304 requires proof (to some level of confidence) that consumer 302 is who they claim to be. For example, consumer 302 may be a customer who desires to finance a vehicle purchase from an automobile dealership, or a home buyer applying for a mortgage from a bank. Alternatively, institution 304 may be a governmental taxation authority and consumer 302 may be a taxpayer desiring to file a tax return for a refund. In still other embodiments institution 304 may be an individual and/or consumer 302 may be a juristic person. Any scenario where one party desires to verify the identity of another party is broadly contemplated as being within the scope of the invention.

Traditionally, to conduct such identity verifications, consumer 302 will present physical identity documents (which usually include security features to make tampering or forgery apparent) to institution 304. However, this limits the scope of identity-verified transactions to those scenarios where consumer 302 can be physically present at institution 304. Remotely transmitting these documents (by, for example, mailing a photocopy or emailing a scanned image) compromises the confidence level of the identity verification process, because the duplicate will necessarily not include the security features of the original documents, making them much easier to alter. For example, a photocopy of a passport is much easier to forge or alter than the passport itself.

To address this problem, embodiments of the invention provide for identity verification blockchains 306. As discussed above, identity verification blockchains 306 broadly store information about the transaction history for consumer 302. In some embodiments, multiple blockchains are used to allow for differing permission levels when reading from or writing to identity verification blockchains 306. For example, any party doing business with consumer 302 might be able to write to transaction chain 308, while only a trusted verification service might be able to write to identity chain 310 and only consumer 302 might be able to write to permission chain 312. In other embodiments, more or fewer blockchains might be employed in identity verification blockchains 306. For example, in a particular embodiment, only a single chain might be used to store identity elements and transaction elements, with permissions managed via permission elements. For the sake of clarity, this specification will refer to separate identity chains, permissions chains and transaction chains; however, one of skill in the art will appreciate that these concepts can be applied when only a single chain stores all three types of elements. For the purposes of this specification, the term "element" may be used to refer to a blockchain, a block in a blockchain, or a transaction in a block in a blockchain.

In some embodiments, encryption may be used to manage access to elements of blockchains 306. As described above, permissions to access individual blocks (or individual transaction of individual blocks) or chains can be managed by other blocks or chains; for example, permission chain 312 can control which principals in the system can read and write to the other blockchains in identity verification blockchains 306. As one example of how encryption can control access to blockchains 306, permission to read from a particular blockchain can be managed as follows: for each block added to the chain, the transactions are encrypted with a block key. An identifier (such as a key fingerprint) for that key can be published as part of the block. To allow a particular principal to read that block, the block key, encrypted with that principal's public key, can then be written to the permissions blockchain. The principal can then decrypt the block key using the corresponding private key and then decrypt the access-restricted data using the block key. Similarly, permission to write to a blockchain can be managed by requiring that transactions be signed by a signing key whose verification key has been added to the permissions chain before they can be added to the blockchain.

Figure 4:
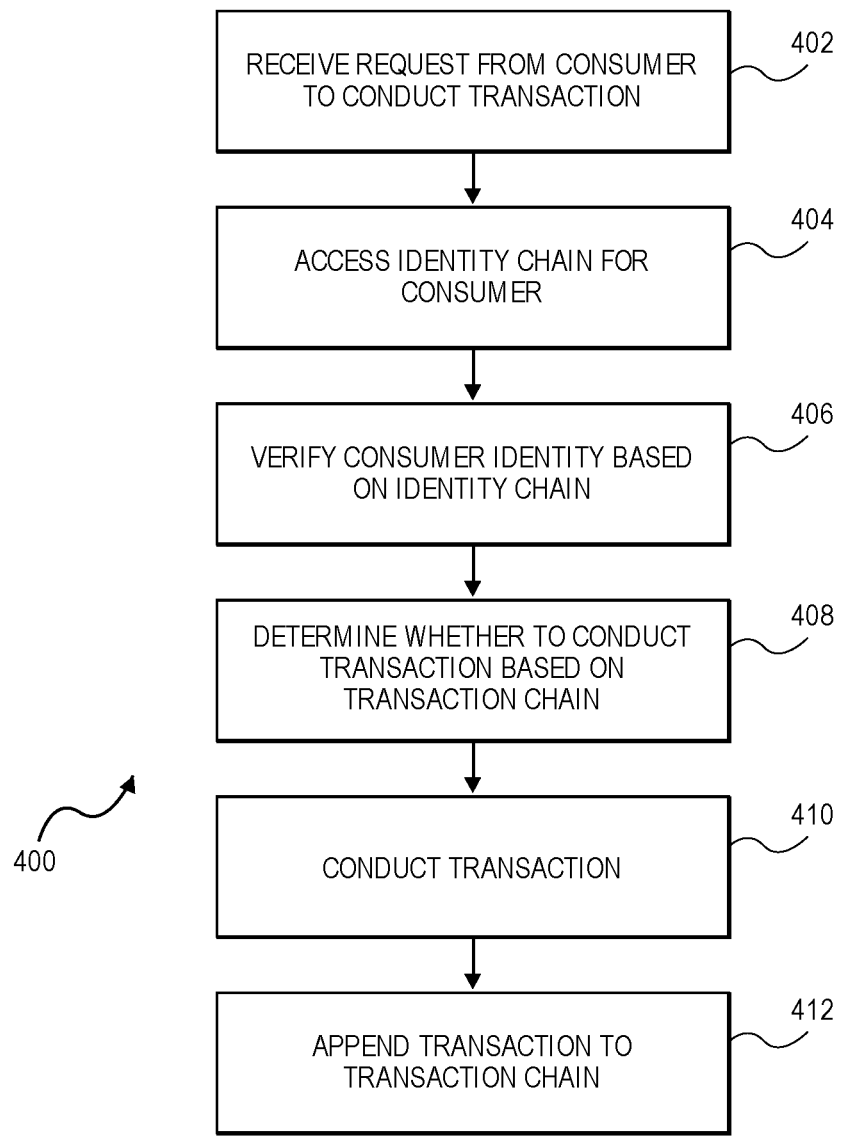
FIG. 4 depicts a flowchart depicting the operation of a method for verifying the identity of a consumer.

Turning now to FIG. 4, a flowchart depicting the operation of a method for verifying the identity of a consumer is depicted and referred to generally by reference numeral 400. As described above, information about past transactions conducted by consumer 302 can be used to determine whether institution 304 should proceed with the present transaction. For example, a consumer presenting similar forms of identification to the forms presented in past transaction that are known to be non-fraudulent is less likely to be fraudulent than a consumer presenting different identification or a consumer that cannot produce the identification previously presented.

The method begins at a step 402, when a request from a consumer to conduct a transaction is received. The circumstances of this request can vary depending on the type of transaction desired. For example, consumer 302 may be physically present at a location of institution 304. Alternatively, the transaction may be conducted over a communications network such as Internet 134. In some embodiments, the request may be received and processed in real time. In other embodiments, the request may be processed asynchronously.

Processing then proceeds to step 404, where the identity chain for consumer 302 is accessed. In some embodiments, multiple ways to locate consumer 302 and/or transactions for consumer 302 in identity verification blockchains 306 are present. For example, consumer 302 may have access to all transactions, while third parties only have access to those transactions to which they were a party. In some embodiments, other parties may be granted access to transactions. For example, credit bureaus may have broad access to transactions for an individual, and governmental agencies may be able to view all transactions or transactions restricted by time and/or geographic location.

In some embodiments, consumer 302 must explicitly grant permission to institution 304 to access their identity chain. In some such embodiments consumer 302 can grant access to only a portion of their identity chain to institution 304. For example, consumer 302 may only need to grant a utility company access to a small subset of their identity documents in order to register to utility service, while a mortgage company would require much more extensive access before granting consumer 302 a mortgage. As described above, consumer 302 can grant access to different elements of their identity chain by publishing the corresponding block keys, wrapped in a public key published by institution 304, to permission chain 312. In some embodiments, each individual identity point has a distinct block key and consumer 302 can therefore grant access to each identity point individually. In other embodiments, identity points are divided into tiers which share a block key, and consumer 302 grants access to tiers of identity points rather than to the individual points.

As described in co-pending application Ser. No. 15/240, 202, an identity point is any information that ties the owner of the identity chain to the identity they claim to be. For example, consumer 302 could store a certified reproduction of their birth certificate (as written to the identity chain by a trusted third party) in their identity chain, encrypted with an appropriate block key. If they subsequently need to produce their birth certificate to conduct business, the can simply publish the block key, wrapped with the requestor's public key, to their permission chain. In this way, the requestor can be assured that the document is genuine (since it was published in an unalterable form to the identity chain by a trusted third party) without requiring that the consumer be physically present to provide the document.

Institution 304 can validate identity points in a variety of ways, depending on the particular identity point. For example, some identity points may be automatically verified by virtue of being present in the identity chain for consumer 302. Other identity points may be verified by techniques known in advance. For example, public-key signatures attached to identity points may be validated to verify the identity point. Still other identity points may include digital code for verifying the identity point. For example, as an alternative for having well-known algorithms for verifying public-key signatures, Eternium-style code for verification could be included as a transaction in the block containing the signed identity block. One of skill in the art will appreciate that code for validating and/or decoding a wide variety of identity point can be include in the identity chain for consumer 302, including decryption and multiple-signature contracts for access to identity points.

In some embodiments, the identity documents themselves are stored in the identity chain. In other embodiments, only techniques for verifying identity documents are stored in the chain, and the identity documents themselves are stored externally. For example, a hash or public-key signature for an identity document could be stored in the identity blockchains, with an optional URL pointing to the document itself. In still other embodiments, some identity documents are stored in the identity blockchains and others are stored externally, with verification techniques stored in the blockchain. Broadly speaking, the identity point stored in the block in the may include a version number for one or more identity documents, or a value pair indicating the document and whether it was physically present, or any other information used to establish the identify of consumer 302. One of skill in the art will appreciate that a comparatively small amount of information may be stored for each identity point or a large amount of information (including scanned images, videos, and other voluminous information) may be stored as needed.

Processing can then proceed to step 406, where the consumer's identity is verified based on the identity points present in the identity chain. In some embodiments, institution 304 may require certain specific identity points in order to verify the identity of consumer 304. For example, the United States Citizenship and Immigration Services requires all new employees to provide certain documents to confirm their employment eligibility. In particular, either a single document from a first list or one document each from a second and third list must be supplied. To replace this verification process, the employer can simply verify that documents meeting these list requirements are present in the identity chain for the employee. If so, then the employer can be assured that they are accordingly eligible for employment.

One of skill in the art will appreciate that other blockchains for consumer 302 may also contribute to the identity score. For example, if identity verification blockchains 306 include a transaction chain 308 for consumer 302 (as discussed in greater detail below), then transactions on that chain may be relevant to identity verification. For example, if consumer has previously conducted business with institution 304 as documented by the transaction chain 308, it may be more likely that they are conducting further business with it, whereas a first transaction with a given institution 304 might not contribute to the identity score in this way. Other features of transactions (such as space/time locality or identity points verified) may also contribute to verifying the identity of consumer 304.

In other embodiments, institution 304 may not require specific documents, but rather a given level of confidence that the identity blockchains actually corresponds to the party it claims to. In order to measure this likelihood, an identity score for consumer 304 may be calculated. For example, a verified driver's license in the identity chain might contribute a particular value to the identity score, while an unverified scan of a utility bill showing a name and address might contribute a smaller value. Additionally, consumer 302 might stipulate in the identity chain that all transactions should be verified to at least a particular minimum score to reduce the likelihood of fraud.

In addition to verifying that the identity blockchains actually corresponds to the party it claims to, institution 304 may also desire to verify to some level of confidence that consumer 302 is actually the owner of identity chain 310. This process is referred to as authentication and is discussed in greater detail in related application Ser. No. 15/240,202. In some embodiments, the ability to grant read permission to institution 304 may contribute to the authentication score for consumer 302. In some embodiments, the identity blockchains may specify how to authenticate consumer 302 when they seek to conduct a transaction protected by the identity blockchain. In other embodiments, identity verification blockchains 306 may include an additional authentication blockchain storing information on how to authenticate a claimant as the owner of the identity blockchain.

Once the identity of consumer 302 has been verified, institution 304 may further access additional information from identity verification blockchains 306 at step 408 to determine whether to proceed with the transaction being conducted. For example, where a transaction chain is present in identity verification blockchains 306, institution 304 can use information on past transactions to determine whether it should proceed with current transaction. In this fashion, identity verification blockchains 306 can further serve as a secure, dynamic credit report for consumer 306. For example the transaction chain 308 might include an indication of whether a transaction was successfully completed and discharged. Thus institution 304 can see that consumer 302 has satisfied past obligations and is more likely to satisfy the obligations of the present transaction.

Similar to the other blockchains in identity verification blockchains 306, the information stored in the transaction chain 308 may be protected by permission chain 312. Thus, read access to transaction data for consumer 302 may not be publicly available, but only available when consumer 302 (or another party with write access to permissions chain 312) grants access. For example, if consumer 320 is applying for credit, they may be willing to reveal greater detail about their financial history.

In some embodiments, the transaction chain 308 could further include unsuccessful or rejected transactions that could also influence the decision of institution 304. Broadly, data stored for a transaction in the transaction chain 308 is a record of the two parties transacting, and may include the parties to the transactions, details of the transaction (e.g., amount of the transaction, type of transaction, purpose of transaction, goods or services making up the transaction, etc.), the identity score for the transaction and/or a timestamp for the transaction. In one embodiment, the identity points that were present (and/or the identity points that were verified) for each transaction are stored in transaction chain 308. In some embodiment, multiple levels of detail for each transaction may be present, separately accessible based on permissions granted by consumer 302. Based on the information in the transaction chain 308, institution 304 can determine whether to proceed with the transaction.

Next, at step 410, the parties can conduct the transaction if institution 304 is satisfied. In some embodiments, consumer 302 can verify the identity and financial history of institution 304 as well, and the transaction proceeds only if both parties are satisfied. Finally, at step 412, the details of the transaction may be recorded in the transaction chain for consumer 302 and/or institution 304. In some embodiments, the same details for the transaction are recorded in both transaction chains. In some embodiments, the satisfaction of the transaction obligation can be recorded with the transaction. In other embodiments, it may not be known at the time of the transaction whether one or both parties have met their obligations, and this information is instead later appended to the transaction chain when it becomes known.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for determining whether to conduct a transaction with a party, comprising:
   receiving a request, from the party, to conduct the transaction;
   accessing a permission element associated with the party to retrieve a first permission to access an identity element associated with the party and a second permission to access a transaction element associated with the party,
   wherein the identity element is stored on an identity chain and the transaction element is stored on a transaction chain,
   wherein the first permission only allows access to the identity chain and the second permission only allows access to the transaction chain,
   wherein the first permission comprises a first permission key and the second permission comprises a second permission key distinct from the first permission key,
   wherein the first permission key allows access to a first plurality of identity points associated with a first identity security level and does not allow access to a second plurality of identity points and a uniform resource locator (URL) associated with a second identity security level,
   wherein the second permission key, by verifying access to the second identity security level, provides access to the second plurality of identity points and the URL,
   wherein the URL points to externally stored documents,
   wherein the first identity security level is based on a first type of the first plurality of identity points and the second identity security level is based on a second type of the second plurality of identity points,
   wherein the second plurality of identity points comprises techniques for verifying the externally stored documents,
   wherein the externally stored documents are stored externally based on a volume of data of the externally stored documents and are accessible by the URL associated with the second plurality of identity points accessible by the second permission key,
   wherein the first plurality of identity points and the externally stored documents are indicative of the party;
   using the first permission key to access the identity element associated with the party to retrieve an identity point for the party from the first plurality of identity points;
   calculating an identity score for the party based at least in part on the identity point;
   using the second permission to access the transaction element associated with the party to retrieve a past transaction summary of a past transaction between the party and a third party,
   wherein the past transaction summary is based on a transaction security level associated with the second permission;
   increasing the identity score based on the past transaction summary;
   determining, based at least in part on the identity score, to conduct the transaction with the party;
   conducting the transaction with the party; and
   appending information associated with the transaction to the transaction element associated with the party.

2. The method of claim 1, wherein the identity element associated with the party comprises at least one block storing computer executable code for decoding the identity point for the party.

3. The method of claim 1, further comprising authenticating the party as an owner of the identity element associated with the party.

4. The method of claim 1, wherein the past transaction summary includes a past transaction identity of one or more parties to the transaction, a party identity score associated with the party, and a timestamp for the transaction.

5. The method of claim 1,
   wherein the permission element is stored on a permission chain, and
   wherein the identity chain, the permission chain, and the transaction chain are distinct blockchains.

6. One or more non-transitory computer-readable media storing computer-executable instructions that, when executed by a processor, perform a method of strengthening an identity for a consumer over time, comprising:
   conducting, by a first institution, a first transaction with the consumer;
   using an identity permission to access an identity element associated with the consumer to retrieve an identity point for the consumer on an identity block,
   wherein the identity block comprises a plurality of identity elements combined in various security levels based on identity types of associated identity elements,
   wherein the identity point comprises a technique for verifying an externally stored identity document;
   wherein the identity permission comprises a first permission key,
   wherein the first permission key corresponds to a security level of the various security levels allowing access to the identity point and a uniform resource locator (URL) pointing to the externally stored identity document,
   wherein the externally stored identity document is stored externally based on a volume of data of the externally stored identity document;
   verifying the identity of the consumer based at least in part on the identity point for the consumer and the externally stored identity document;
   appending a transaction block to a blockchain associated with the consumer,
   wherein the transaction block is distinct from the identity block,
   wherein the transaction block includes a plurality of details associated with the first transaction,
   wherein each detail of the plurality of details corresponds to a security tier level of two or more security tier levels associated with the consumer;
   receiving, by a second institution, a request to conduct a second transaction with the consumer;
   granting, by the consumer and to the second institution, a transaction permission to access a portion of the transaction block,
   wherein the transaction permission comprises a second permission key distinct from the first permission key,
   wherein the second permission key corresponds to a permission security tier level of the two or more security tier levels,
   wherein the portion of the transaction block includes each detail of the plurality of details which have a transaction security tier level corresponding to the permission security tier level;

allowing the second transaction based on the portion of the transaction block and the identity of the consumer being verified; and strengthening the identity of the consumer based on the second transaction being allowed.

7. The media of claim 6, wherein the method further comprises appending an additional transaction block to a block chain associated with the consumer, wherein the additional transaction block includes a plurality of second transaction details associated with the second transaction.

8. The media of claim 6, wherein the method further comprises authenticating, by the second institution, the consumer as being associated with the identity stored by the second institution.

9. The media of claim 6, wherein the plurality of details associated with the first transaction comprise one or more parties to the first transaction and a monetary amount associated with the first transaction.

10. The media of claim 6, wherein the plurality of details associated with the first transaction comprise one or more identity points verified during the first transaction.

11. The media of claim 6, wherein the transaction permission provides access to only the transaction block.

12. One or more non-transitory computer-readable media storing computer-executable instructions that, when executed by a processor, access a plurality of blocks, the plurality of blocks comprising:
an identity block for a consumer,
wherein the identity block is writable only by a trusted third party,
wherein the identity block is readable only by the consumer and parties authorized by the consumer, and
wherein the identity block stores a plurality of identity points for the consumer and at least one uniform resource locator (URL), wherein an identity point corresponds to an identity tier and the URL points to an externally stored document,
wherein each identity tier comprises a security level based on an identity type of the identity point;
wherein the identity point can only be accessed by an identity permission key corresponding to the identity tier of the identity point and the URL, and
wherein the identity point of the plurality of identity points comprises a technique for verifying the externally stored document,
wherein the externally stored document is stored externally based on a volume of data of the externally stored document and is accessible by the URL;
a transaction block for the consumer,
wherein the transaction block is readable only by the consumer and one or more parties authorized by the consumer,
wherein the transaction block is storing information related to a plurality of transactions to which the consumer was a party,
wherein each transaction of the plurality of transactions comprises a plurality of transaction details,
wherein each transaction detail of the plurality of transaction details corresponds to a transaction tier,
wherein each transaction detail can only be accessed by a transaction permission key corresponding to the transaction tier of each transaction detail;
wherein the transaction permission key is provided by the consumer; and
a permissions block for the consumer,
wherein the permissions block is writable only by the consumer, and
wherein the permissions block is storing permissions for third parties to access the identity block for the consumer and the transaction block for the consumer,
wherein the identity block, the transaction block, and the permissions block are distinct blocks.

13. The media of claim 12, wherein the plurality of blocks further comprises an authentication block storing information usable to authenticate the consumer as an owner of a chain.

14. The media of claim 12, wherein the plurality of blocks further comprises an additional identity block for an additional consumer, an additional transaction block for the additional consumer, and an additional permissions block for the additional consumer.

15. The media of claim 12, wherein the permissions stored in the permissions block for the consumer comprise the identity permission key and the transaction permission key.

16. The media of claim 12, wherein the information related to the plurality of transactions to which the consumer was party includes one or more transaction parties for each transaction, a monetary amount for each transaction, and a timestamp for each transaction.

17. The media of claim 12, wherein the identity block is stored on an identity chain, the transaction block is stored on a transactions chain, and the permissions block is stored on a permissions chain.

18. The media of claim 12, wherein the information related to the plurality of transactions to which the consumer was party includes a location for each transaction.

19. The media of claim 12, wherein the identity block includes a driver's license.

20. The media of claim 12, wherein the identity point contributes a particular value to an identity score based on a type of the identity point.

* * * * *